UNITED STATES PATENT OFFICE.

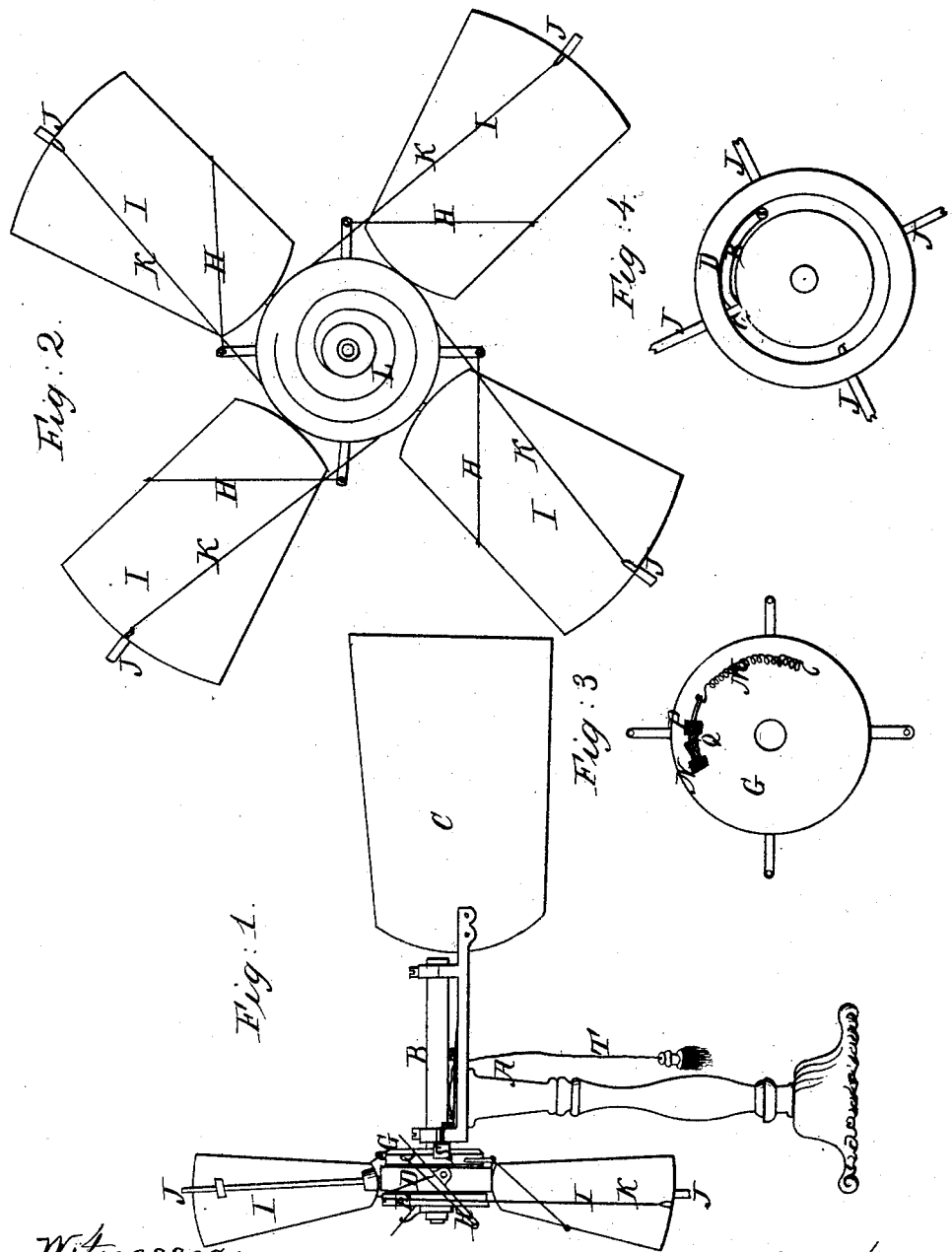

E. WILSON MILLS, OF AMBER, NEW YORK.

IMPROVEMENT IN WINDMILLS.

Specification forming part of Letters Patent No. 28,100, dated May 1, 1860.

*To all whom it may concern:*

Be it known that I, E. WILSON MILLS, of Amber, in the county of Onondaga and State of New York, have invented a new and useful Improvement in Windmills; and I do hereby declare that the following is a full, clear, and exact description of the construction and operation of the same, reference being had to the annexed drawings, making a part of this specification, in which—

Figure 1 is a side elevation. Fig. 2 is a front view. Fig. 3 is a front view of the brake-wheel. Fig. 4 is a rear view of the hub.

The letters of reference refer to the same parts in each figure.

A is a bed-plate or frame that is made to support the various parts of the mill. There is nothing peculiar in its construction. Any of the known methods of construction may be used.

B is the arbor that supports the wheels and communicates the power of the wings to other machinery.

C is the fan or vane of ordinary construction.

D is the hub that supports the arms J. It is secured to the arbor. The front surface has a projection in the center to attach a spring to. The rear surface, Fig. 4, has a circular groove for a catch and springs. The arms J are inserted in its periphery.

E is the spring wheel or drum. It is made to receive the spring. At the inside of the rim one end of the spring is attached. At the outside of the rim are attached cords or chains K, as many in number as there are wings. These cords or chains at the other end are secured to the wings. With these cords the spring may be wound up to any degree required by carrying the strings to the next forward wing, thus regulating the effective force of the wings. These cords and spring act centripetally on the wings, and in proportion to this power so is the power of the wings, for if the centrifugal force of the wings when in motion overcomes the force of the spring with little force—as with a gentle breeze or slowly rotating—then there is but little power; but when the spring is wound up or otherwise made strong then the wings may rotate more rapidly without their centrifugal force overcoming the spring, and the wings have more power. By this spring the effective force of the wings may be regulated.

G is a brake-wheel fitted loosely upon the arbor. It has a stop N on the side next to the hub, that prevents it being turned faster than the hub. It is held by a spring to the stop O of the hub D. It also has a catch Q and stop P. The stop P prevents the wheel being turned too far backward by means of the brakes S. This stop must be placed just far enough from the forward stop to allow the wheel a backward movement far enough to turn the wings edgewise to the wind. The catch Q is placed so as to hold the wheel G in this position while the brakes are applied; but when the brakes are withdrawn the spring R will force the catch Q loose and the wheel will be brought to its former position by means of the spring M. At the periphery of this wheel are arms (as many as there are wings) that hold one end of the brace-rods H. With the brakes S the motion of this wheel G may be retarded, and thus the wings turned edgewise to the wind and stopped.

H H H and H are rods or chains. One end of each is attached to the arms of the wheel G. The other end is attached to the forward edge of the wings. Their use is to turn the wings edgewise to the wind when the wheel G is retarded and to hold the wings to the wind according to their centrifugal motion.

I I I and I are wings fitted to the arms J by a loose and turning joint, so that they may be turned or moved freely so that when rotating too rapidly they tend to fly off centrifugally and may be turned edgewise at the same time by means of the rods H.

J J J and J are arms secured to the hub D. Their length must be greater than the wings or must project beyond the journal-boxes of the wings, so that they will hold the wings in any of their positions. They must be round and smooth so that the wings may move freely.

K K K and K are cords or chains. One end is attached to the spring-wheel E, the other end to the wings I. They hold the wings to the hub D when not in motion, and when in motion they hold them in proportion to the velocity of the wings and force of the spring L.

L is a spring. It may be made as a watch-spring or otherwise, so as to perform the same office. Its use is to regulate the effective force of the wings and allow them to move as before mentioned.

M is a spring. One end is fastened to the hub D, the other to the wheel G. Its use is to hold the stops N and O together when the wings are rotating.

N is a stop on the wheel G. Its use is to hold the wheel in proper position.

O is a stop on the hub D. Its use is to prevent the wheel G from being turned too far either way.

P is also a stop that prevents the wheel G from being turned or held too far backward by action of the brakes. The distance between these stops must be such as to allow the wings a proper distance to move.

Q is a catch that holds the wheel G from moving forward while the brakes are applied.

R is a spring that forces the catch Q loose when the brakes are detached.

S and S are brakes fitted to the angular portion of the wheel G so that they will retard the motion of the wheel and force the wheel against the hub D at the same time. These brakes are actuated by means of a spring-coupling and cord T, so that by pulling the cord the spring-coupling will be deflected and thus force the brakes upon the wheel G, and when the cord T is loosened the spring-coupling will throw the brakes apart and away from the wheel G.

T is a cord that is attached to the spring-coupling of the brakes. By pulling it down the brakes will be applied to the wheel G and thus retard its motion and cause the wings to be turned edgewise to the wind, thereby stopping the mill so long as the cord is held. When desirable to start the mill, let go the cord and the mill will proceed as before.

What I claim as my invention, and desire to secure by Letters Patent, is—

The general arrangement and combination of the several parts, viz: hub D, wheel E, spring L, and wheel G, with its stops N and P, and catch Q, spring M, rods H, and cords K, when constructed as specified and used for the purpose set forth.

E. WILSON MILLS.

Witnesses:
JOHN C. MILLS,
CHARLES KETCHUM.